US012070788B2

(12) United States Patent
Ogawa et al.

(10) Patent No.: US 12,070,788 B2
(45) Date of Patent: Aug. 27, 2024

(54) MANUFACTURING METHOD FOR RECTANGULAR CAN

(71) Applicant: TOYO SEIKAN CO., LTD., Tokyo (JP)

(72) Inventors: Yousuke Ogawa, Yokohama (JP); Kei Oohori, Yokohama (JP); Tatsuya Osafune, Yokohama (JP); Takanori Nakagawa, Yokohama (JP); Kazuhiko Tsukada, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 597 days.

(21) Appl. No.: 17/417,914

(22) PCT Filed: Dec. 16, 2019

(86) PCT No.: PCT/JP2019/049108
§ 371 (c)(1),
(2) Date: Jun. 24, 2021

(87) PCT Pub. No.: WO2020/137645
PCT Pub. Date: Jul. 2, 2020

(65) Prior Publication Data
US 2022/0072599 A1   Mar. 10, 2022

(30) Foreign Application Priority Data
Dec. 26, 2018   (JP) ................. 2018-242516

(51) Int. Cl.
*B21D 22/30* (2006.01)
*B21D 51/26* (2006.01)
*H01M 50/103* (2021.01)

(52) U.S. Cl.
CPC ............. *B21D 22/30* (2013.01); *B21D 51/26* (2013.01); *H01M 50/103* (2021.01)

(58) Field of Classification Search
CPC .... B21D 22/30; B21D 51/26; B21D 51/2646; B21D 51/2653; B21D 51/2669
See application file for complete search history.

(56) References Cited

U.S. PATENT DOCUMENTS 4,536,243 A * 8/1985 Imatani .................. B21D 51/26
  413/1
5,095,733 A * 3/1992 Porucznik .............. B21D 22/20
  72/347

(Continued)

FOREIGN PATENT DOCUMENTS

JP   S63-239763 A   10/1988
JP   H09-265966 A   10/1997

(Continued)

OTHER PUBLICATIONS

Search Report in International Application No. PCT/JP2019/049108 dated Jan. 28, 2020, 4 pages.

(Continued)

*Primary Examiner* — Teresa M Ekiert
(74) *Attorney, Agent, or Firm* — MARSHALL, GERSTEIN & BORUN LLP

(57) ABSTRACT

Provided is a manufacturing method for a rectangular can according to which it is possible to bring an angle formed by a step surface of a step provided in a rectangular can body and an inner wall surface of the rectangular can body closer to 90 degrees. In a step-forming step, using a die 310 that is provided on an outer wall surface side of a sidewall on which the step is to be formed, a mandrel 410 for sandwiching the sidewall between the mandrel 410 and the die 310 on the bottom side relative to a portion where the step is to be formed in the inner wall surface on which the step is to be formed, and a punch 420 for pressing the side opposite to the bottom side relative to the portion where the step is to be formed in the inner wall surface on which the step is to be (Continued)

formed and compressing the sidewall between the punch 420 and the die 310, the step is formed by performing multiple instances of a pressing operation performed by the punch 420.

11 Claims, 9 Drawing Sheets

(56) References Cited

U.S. PATENT DOCUMENTS

| | | |
|---|---|---|
| 9,370,844 B2 | 6/2016 | Suzuki et al. |
| 2009/0311594 A1 | 12/2009 | Uh |
| 2015/0224668 A1 | 8/2015 | Tanaka et al. |
| 2019/0112100 A1* | 4/2019 | Scott ............... B21D 51/26 |
| 2020/0215597 A1 | 7/2020 | Manita et al. |

FOREIGN PATENT DOCUMENTS

| | | |
|---|---|---|
| JP | H09-293487 A | 11/1997 |
| JP | 3160755 B2 | 4/2001 |
| JP | 2001-179350 A | 7/2001 |
| JP | 2009-302056 A | 12/2009 |
| JP | 4415437 B2 | 2/2010 |
| JP | 2013-093119 A | 5/2013 |
| JP | 2013-196777 A | 9/2013 |
| JP | 2014-010936 A | 1/2014 |
| JP | 2014-46313 A | 3/2014 |
| JP | 2014-203706 A | 10/2014 |
| JP | 6035796 B2 | 11/2016 |
| JP | 2016-203212 A | 12/2016 |
| JP | 2018-022586 A | 2/2018 |
| JP | 2019-025541 A | 2/2019 |

OTHER PUBLICATIONS

Extended European Search Report in EP Application No. 19903694.8 dated Aug. 17, 2022, 7 pages.

Notice of Submission of Publications dated Mar. 15, 2022, 9 pages.

* cited by examiner

MANUFACTURING METHOD FOR RECTANGULAR CAN

TECHNICAL FIELD

The present disclosure relates to a manufacturing method for a rectangular can having a rectangular can body provided with a step on which a sealing lid is placed.

BACKGROUND ART

A rectangular can has been used as a container in a secondary battery (power storage battery) or the like in view of accommodation capability and the like. Such a rectangular can includes a rectangular can body and a sealing lid for closing an opening of the rectangular can body. In the rectangular can, a step on which the sealing lid is to be placed is provided on an inner wall surface of the rectangular can. The sealing performance can be increased the closer an angle formed by a surface of the step and the inner wall surface is to 90 degrees. However, in a conventional manufacturing method, it has been difficult to bring the angle close to 90 degrees.

CITATION LIST

Patent Literature

[PTL 1]
Japanese Laid-Open Patent Publication No. 2014-203706
[PTL 2]
Japanese Laid-Open Patent Publication No. 2013-196777
[PTL 3]
Japanese Laid-Open Patent Publication No. 2001-179350
[PTL 4]
Japanese Laid-Open Patent Publication No. H9-293487
[PTL 5]
Japanese Laid-Open Patent Publication No. H9-265966

SUMMARY OF THE INVENTION

Technical Problem

An object of the present disclosure is to provide a manufacturing method for a rectangular can according to which brings an angle formed by a surface of a step provided on a rectangular can body and an inner wall surface of the rectangular can body closer to 90 degrees.

Solution to Problem

The present disclosure employed the following means in order to achieve the object.

That is, the manufacturing method for a rectangular can of the present disclosure is a manufacturing method for a rectangular can including a rectangular can body that has a rectangular tube and a bottom, and a sealing lid for closing an opening of the rectangular can body, the manufacturing method including:
a step of manufacturing an intermediate molded article that has the rectangular tube and the bottom; and
a step of forming respective steps on which the sealing lid is to be placed on at least a pair of facing inner wall surfaces among two pairs of facing inner wall surfaces in the rectangular tube, wherein
in the step-forming step, using
a die that is provided on an outer wall surface side of a sidewall on which the step is to be formed,
a mandrel for sandwiching the sidewall between the mandrel and the die at a portion on a bottom side with respect to a portion where the step is to be formed in the inner wall surface on which the step is to be formed, and
a punch for pressing a portion on a side opposite to the bottom side with respect to the portion where the step is to be formed in the inner wall surface on which the step is to be formed and compressing the sidewall between the punch and the die,
the step is formed by performing a plurality of instances of a pressing operation performed by the punch.

According to the present disclosure, it is possible to bring the angle formed by a surface of the step provided on the rectangular can body and the inner wall surface of the rectangular can body closer to 90 degrees by forming the step through multiple instances of the pressing operation performed by the punch.

The outer wall surface of the sidewall formed in the step of manufacturing the intermediate molded article may be constituted by a level plane,
the inner wall surface of the sidewall formed in the step of manufacturing the intermediate molded article may include:
a first parallel surface that is formed at a portion on the bottom side with respect to the portion where the step is to be formed and is parallel to the outer wall surface;
a second parallel surface that is formed at a portion on the side opposite to the bottom side with respect to the portion where the step is to be formed and is parallel to the outer wall surface, the distance between the second parallel surface and the outer wall surface being shorter than a distance between the first parallel surface and the outer wall surface; and
a connection surface that connects the first parallel surface and the second parallel surface, and
in the step-forming step, a portion of the connection surface may be compressed.

This makes the forming of the step less difficult compared to the case where the step is formed by simply performing multiple instances of the pressing operation performed by the punch on a plate-shaped portion.

In the pressing operation performed by the punch, a movement amount of the punch moving toward the die may increase each instance of the pressing operation, which is performed repeatedly. In addition, in the pressing operation performed by the punch, a movement amount of the punch moving toward the die may increase in stages as the number of instances of the pressing operation, which is performed repeatedly, increases. Furthermore, in the pressing operation performed by the punch, a movement amount of the punch moving toward the die may also be the same for all pressing operations, which are performed repeatedly.

The connection surface formed in the step of manufacturing the intermediate molded article may be provided at positions reaching four corners of the rectangular tube, and the step may be formed also at the four corners in the step-forming step.

The step of manufacturing the intermediate molded article may include a drawing and ironing step of molding the rectangular tube, and a step surface that is level with the step surface of the step may be formed in advance at the four corners of the rectangular tube through the drawing and ironing step.

A trimming step of removing a portion, which is unneeded for a final product, on a side opposite to the bottom side of the intermediate molded article may be included after the step-forming step, and at least a part of the sidewall on which the step is to be formed in the portion to be removed in the trimming step may be removed in advance prior to the step-forming step.

Note that the above-described configurations can be employed in combination with each other as far as possible.

Advantageous Effects of Invention

As described above, the present disclosure brings the angle formed by the surface of the step provided on the rectangular can body and the inner wall surface of the rectangular can body closer to 90 degrees.

DESCRIPTION OF EMBODIMENTS

Hereinafter, a mode of carrying out the disclosure will be described illustratively and in detail based on an embodiment with reference to the drawings. Note that, unless specifically stated otherwise, the scope of the disclosure is not limited to only the dimensions, materials, shapes, relative arrangement, and the like of the constituent parts described in the embodiment.

Embodiment

A manufacturing method for a rectangular can according to an embodiment of the present disclosure will be described with reference to FIGS. 1 to 9. A rectangular can obtained through the manufacturing method according to the present embodiment will be described before the manufacturing method for the rectangular can is described.

<Rectangular Can>

Figure 1:
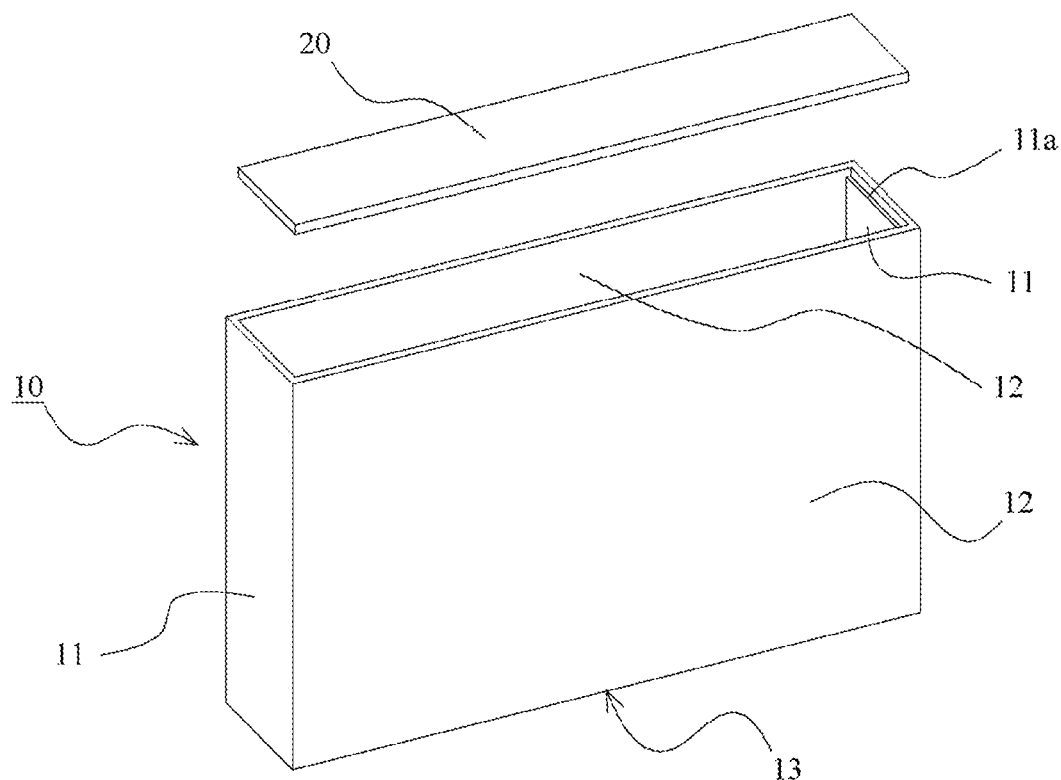
FIG. 1 is a perspective view showing an overview of a rectangular can according to an embodiment of the present disclosure.

A rectangular can that is manufactured using the manufacturing method according to the present embodiment will be described with reference to FIG. 1. FIG. 1 is a perspective view showing an overview of the rectangular can. For the sake of convenience in the description, FIG. 1 shows a state prior to a sealing lid 20 being attached to a rectangular can body 10. The rectangular can manufactured through the manufacturing method includes the rectangular can body 10, and the sealing lid 20 that closes an opening of the rectangular can body 10. The rectangular can body 10 and the sealing lid 20 are obtained by machining a metal plate such as an aluminum alloy, a cold rolled steel plate, or stainless steel. The rectangular can body 10 is constituted by a rectangular tube having two pairs of sidewalls (short sidewalls 11 and long sidewalls 12) that have inner wall surfaces that face each other, and a bottom 13. Note that the pair of sidewalls with a shorter width among the two pairs of sidewalls are called the short sidewalls 11 and the pair of sidewalls with a longer width are called the long sidewalls 12.

Steps 11a are respectively provided on the inner wall surfaces of the pair of short sidewalls 11. In a state in which the sealing lid 20 is placed on surfaces of the steps 11a, the sealing lid 20 is fixed to the rectangular can body 10 through laser welding, arc welding or the like. The rectangular can according to the present embodiment can be suitably used as a container for a secondary battery (power storage battery). In this case, the sealing lid 20 is fixed after power generation elements constituting the battery, such as electrodes and separators, have been installed in the rectangular can body 10.

<Overview of Manufacturing Step for Rectangular Can>

An overview of a manufacturing method for a rectangular can according to the present embodiment will be described below. The manufacturing method for the rectangular can includes a step of manufacturing the rectangular can body 10 and a step of fixing the pre-manufactured sealing lid 20 to the rectangular can body 10 as described above. The step of manufacturing the rectangular can body 10 is composed of a step of molding an intermediate molded article 100, a step of forming the above-described steps 11a in the intermediate molded article 100, and a trimming step of removing unnecessary portions.

In addition, the step of manufacturing the intermediate molded article includes at least a step of carrying out punching on a metal plate in order to obtain a raw material (blank) with a predetermined outer shape, a step of carrying out drawing and ironing multiple times on the blank, and a pressing step of forming the above-described bottom 13. Since a known technique (e.g., see Japanese Laid-Open Patent Publication No. 2018-51575) may be employed as appropriate for these steps, description thereof is omitted. As for the trimming step, a known technique may be employed as well, thus description thereof is omitted.

Figure 2:
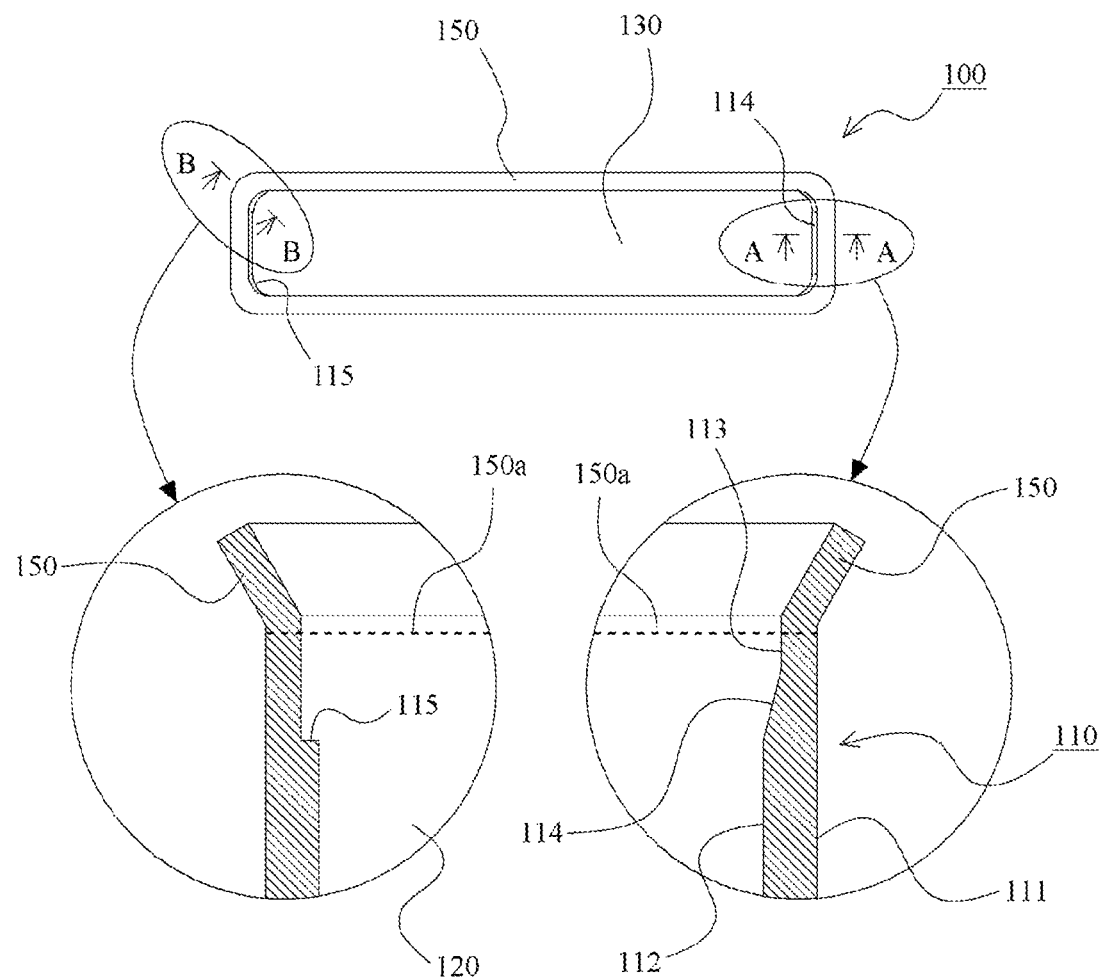
FIG. 2 is an overall view of an intermediate molded article of the rectangular can according to the embodiment of the present disclosure.

The intermediate molded article 100 manufactured through the step of manufacturing the intermediate molded article will be described with reference to FIG. 2. FIG. 2 is an overall view of the intermediate molded article of the rectangular can. FIG. 2 shows a plan view of the intermediate molded article, and schematic cross-sectional views of two locations (a cross-sectional view taken along line AA and a cross-sectional view taken along line BB in the plan view). The intermediate molded article 100 includes a pair of portions 110 that are to be the short sidewalls 11 in a final product, a pair of portions 120 that are to be the long sidewalls 12 in the final product, a portion 130 that is to be the bottom 13 in the final product, and a portion 150 that is to be removed during the trimming step. Note that a dotted line 150*a* in FIG. 2 shows a cutting surface that is to be cut in the trimming step. The portion 150 to be removed is on a side near the opening with respect to this dotted line 150*a*. A section constituted by the pair of short-sidewall-forming portions 110 and the pair of long-sidewall-forming portions 120 corresponds to the rectangular tube in the intermediate molded article 100, and the bottom-forming portion 130 corresponds to the bottom in the intermediate molded article 100.

In the next step, that is, the step-forming step, the steps 11*a* are formed on the inner wall surfaces of the short-sidewall-forming portions 110 serving as the sidewalls. The outer wall surface 111 of the short-sidewall-forming portion 110 is constituted by a level plane. The inner wall surface of the short-sidewall-forming portion 110 includes a first parallel surface 112 that is parallel to the outer wall surface 111, a second parallel surface 113 that is parallel to the outer wall surface 111 as well, and an inclined surface 114 serving as a connection surface that connects the first parallel surface 112 and the second parallel surface 113. The first parallel surface 112 is formed on a side near the bottom 13 (bottom-forming portion 130) with respect to the portion where the step 11*a* is to be formed. The second parallel surface 113 is formed on a side opposite to the bottom 13 side (i.e., on a side near the opening) with respect to the portion where the step 11*a* is to be formed. The second parallel surface 113 is constituted such that the distance to the outer wall surface 111 is shorter than the distance between the first parallel surface 112 and the outer wall surface 111. Accordingly, the short-sidewall-forming portion 110 is constituted such that the thickness of the portion at which the second parallel surface 113 is formed is less than the thickness of the portion at which the first parallel surface 112 is formed.

In the step-forming step described hereinafter, a portion of the inclined surface 114 is compressed. Accordingly, a step surface 11*b* of the step 11*a* is formed at a position of a boundary between the first parallel surface 112 and the inclined surface 114.

In the intermediate molded article 110, step surfaces 115 that are level with the step surfaces 11*b* of the step 11*a* are provided at four corners of the rectangular tube formed by the pair of short-sidewall-forming portions 110 and the pair of long-sidewall-forming portions 120. The step surfaces 115 are formed through the drawing and ironing step in the step of manufacturing the intermediate molded article.

<Step-Forming Step>

Figure 3:
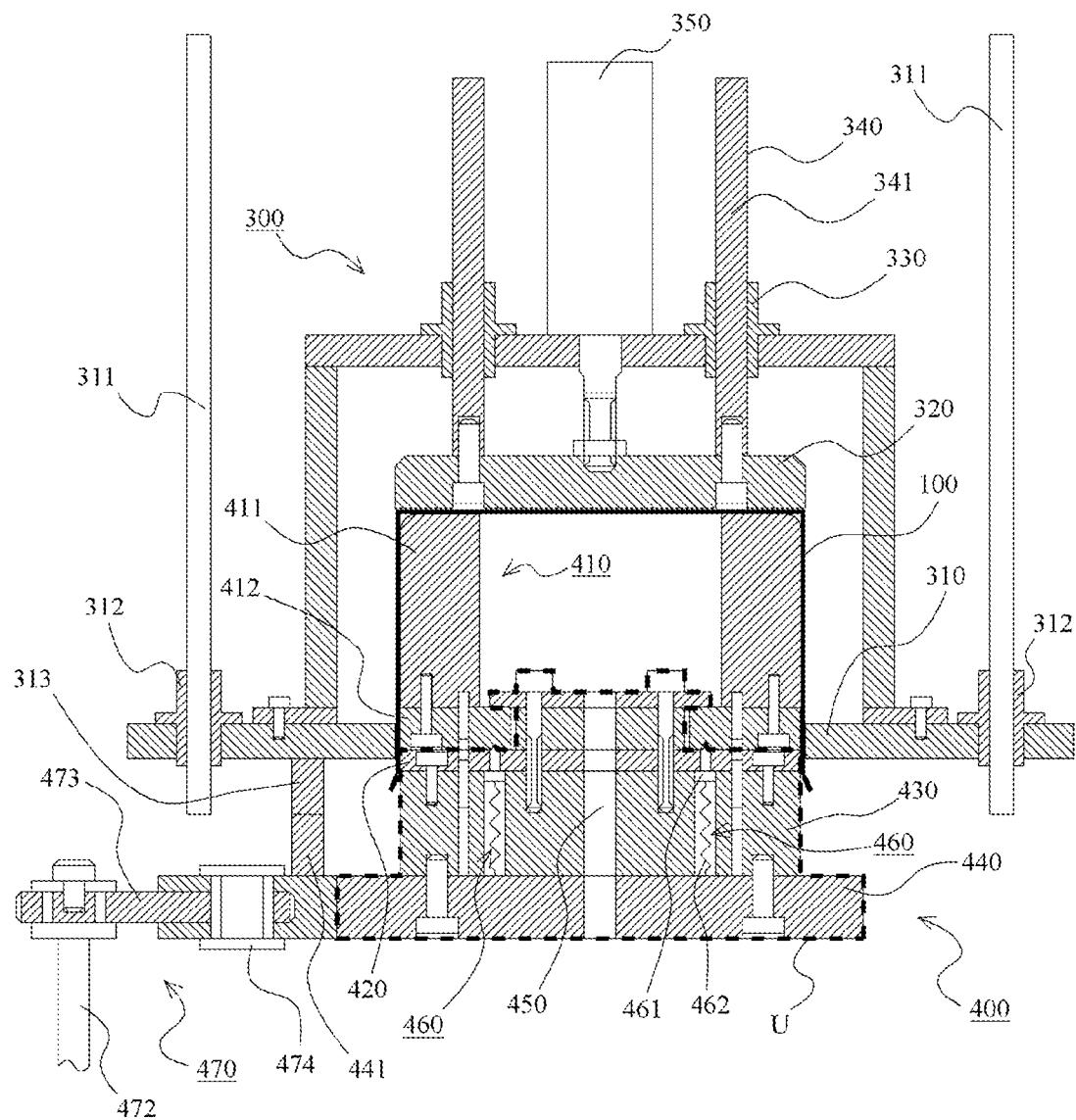
FIG. 3 is a schematic cross-sectional view of a machining apparatus provided in a step-forming step in a manufacturing method for the rectangular can according to the embodiment of the present disclosure.
Figure 4:
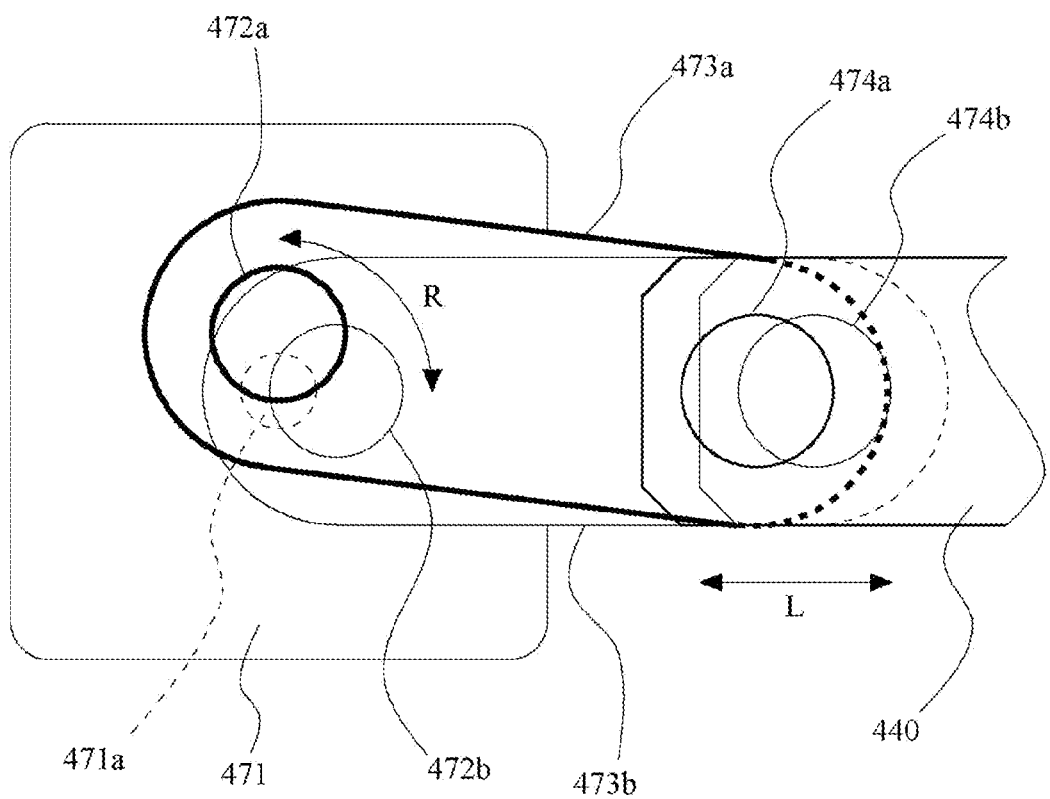
FIG. 4 is an illustrative diagram illustrating a mechanism of the machining apparatus provided in the step-forming step in the manufacturing method for the rectangular can according to the embodiment of the present disclosure.
Figure 5:
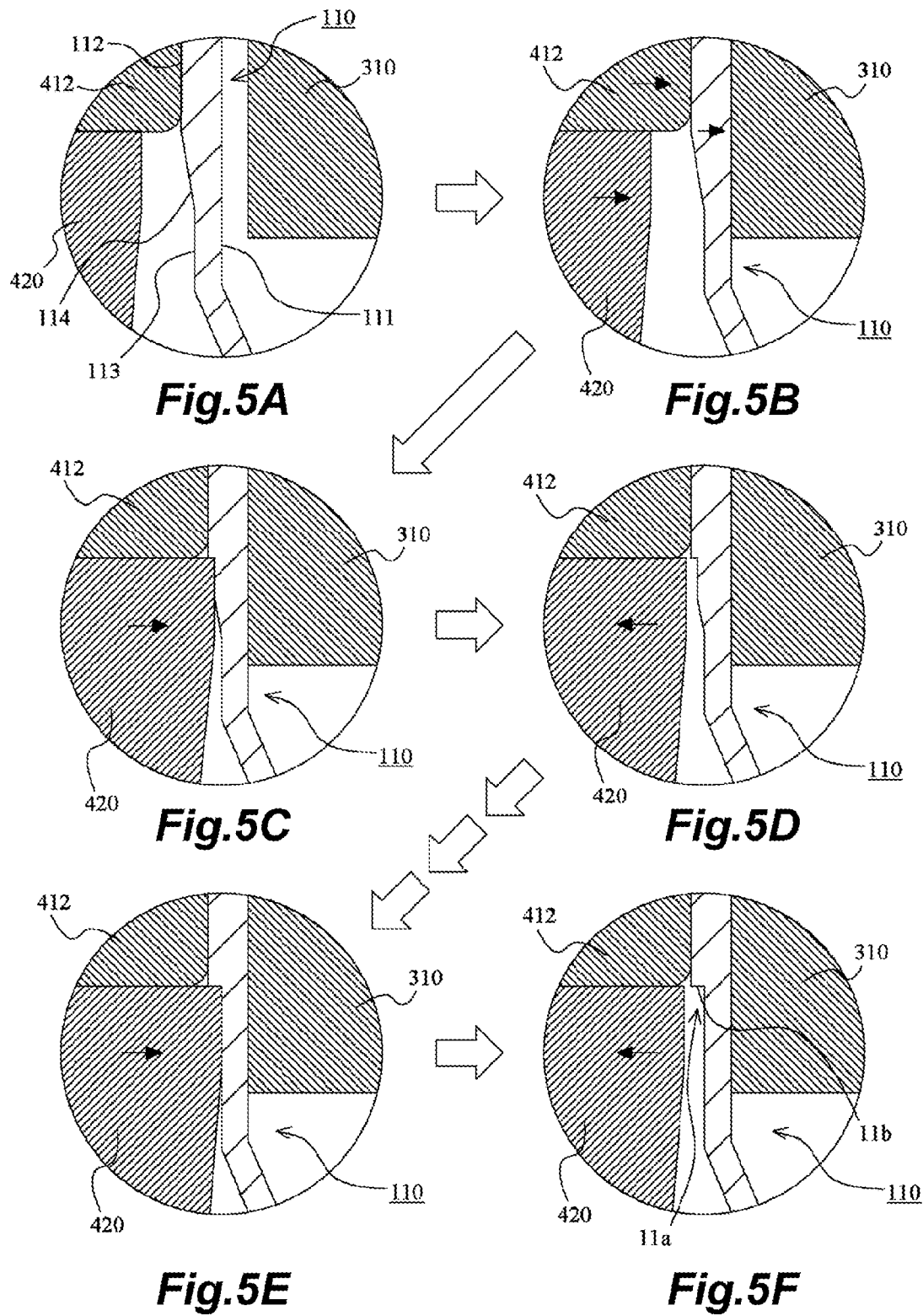
FIG. 5 is a process diagram of the step-forming step in the manufacturing method for the rectangular can according to the embodiment of the present disclosure.
Figure 6:
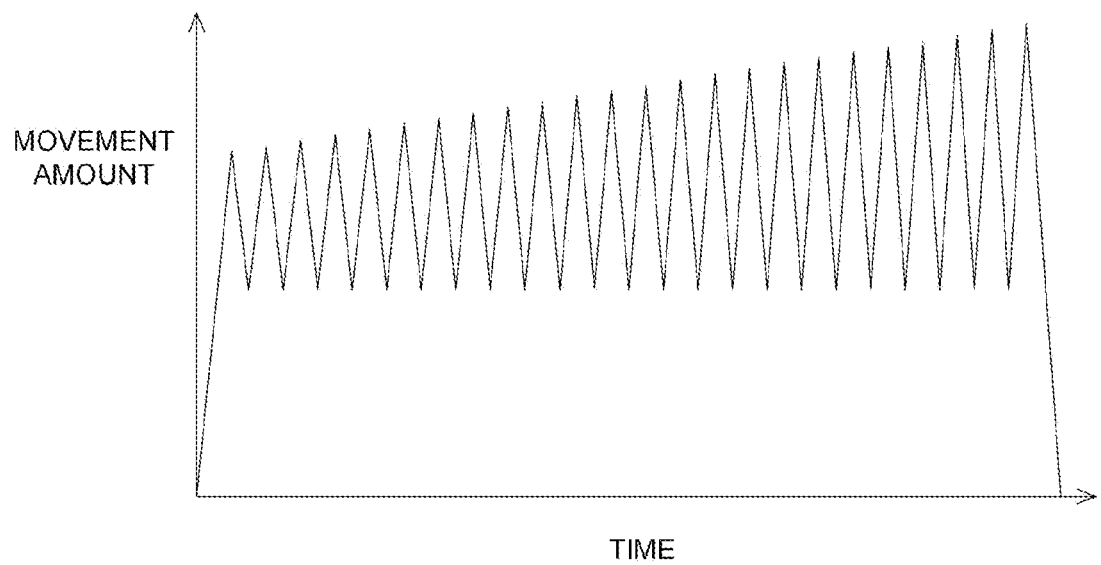
FIG. 6 is a diagram illustrating an example of a manner of driving a punch according to the embodiment of the present disclosure.
Figure 7:
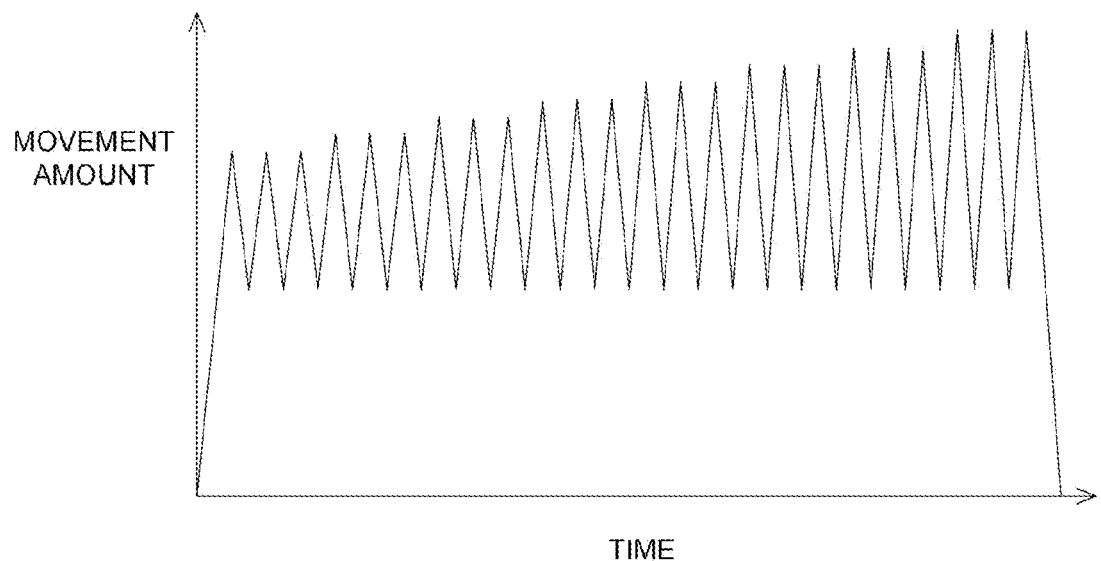
FIG. 7 is a diagram illustrating an example of a manner of driving the punch according to the embodiment of the present disclosure.
Figure 8:
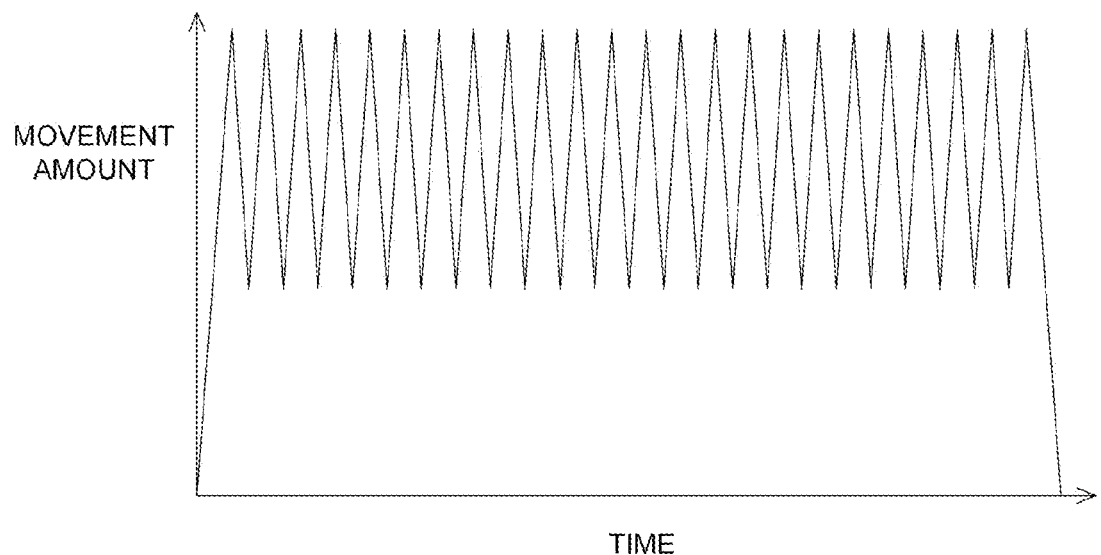
FIG. 8 is a diagram illustrating an example of a manner of driving the punch according to the embodiment of the present disclosure.

The step-forming step will be described with reference to FIGS. 3 to 8. FIG. 3 is a schematic cross-sectional view of a machining apparatus to be used in the step-forming step in the manufacturing method for the rectangular can. FIG. 4 is an illustrative diagram illustrating a mechanism of the machining apparatus to be used in the step-forming step in the manufacturing method for the rectangular can, and more specifically, is a diagram illustrating a mechanism for driving a punch. FIG. 5 is a process diagram of the step-forming step in the manufacturing method for the rectangular can. FIG. 5 shows a cross section for each member. FIGS. 6 to 8 are diagrams illustrating examples of a manner of driving the punch.

<<Machining Apparatus>>

An example of the machining apparatus that can be used in the step-forming step will be described with reference to FIGS. 3 and 4. The machining apparatus is constituted by an upper mold 300 and a lower mold 400. The upper mold 300 includes a die 310 and a bottom pad 320. The lower mold 400 includes a mandrel 410, a punch 420, a drive mechanism 470 that moves the punch 420 relative to the mandrel 410, and an air vacuum hole 450 for vacuuming when the mandrel 410 is to be inserted into the intermediate molded article 100 and sending air when the mandrel 410 is to be pulled out. The lower mold 400 also includes an upper platform 430 and a lower platform 440 that support the mandrel 410 and the punch 420.

The upper mold 300 and the lower mold 400 are formed to move toward each other and away from each other in the vertical direction. The intermediate molded article 100 is placed on the mandrel 410 of the lower mold 400 with the portion 150 to be removed on a lower side.

The bottom pad 320 is pressed to a lower surface of the bottom-forming portion 130 of the intermediate molded article 100 while an up-down stroke of pins 340 is guided by guides 330 provided on a frame of the upper mold 300 and pressing force of the bottom pad 320 is adjusted by an air cylinder 350. Accordingly, the intermediate molded article 100 is prevented from being misaligned in the vertical direction during machining. After the intermediate molded article 100 is positioned by the bottom pad 320, the die 310 is lowered while being guided by a guide 312, which is provided to move along pins 311. The die 310 lowers to a position facing both the punch 420 and a support portion 412 of the mandrel 410. The die 310 is lowered until a block 313 provided below the die 310 abuts on a block 441 provided on the lower platform 440, and thus the 310 is positioned. Note that the method for positioning the die 310 is not limited to this.

The mandrel 410 includes a guiding portion 411 that guides an inner peripheral surface of the intermediate molded article 100 when the intermediate molded article 100 is to be placed on the mandrel 410, and the support portion 412 that supports a part on a side near the bottom-forming portion 130 with respect to the step-forming portion. A lower surface of the support portion 412 of the mandrel 410 and an upper surface of the punch 420 are slidably in contact with each other and a height of a boundary line therebetween matches that of the step surface 11*b* of the step 11*a* formed in the intermediate molded article 100. The movement of the mandrel 410 is regulated by the die 310 across the intermediate molded article 100 when the punch 420 is moved in the horizontal direction by the drive mechanism 470 to be described.

A positioning pin structure 460 is provided on the sliding surface between the mandrel 410 and the punch 420. When the regulation of the movement of the mandrel 410 by the die 310 is removed, the mandrel 410 and the punch 420 are automatically mutually positioned so that the mandrel 410 and the punch 420 return to a home position (origin) where the mandrel 410 and the punch 420 overlap at approximately the same position in a plan view. The sliding surface of the punch 420 is provided with a pin 461 that is pressed toward the sliding surface of the mandrel 410 by a pressing means 462 such as a spring and the sliding surface of the mandrel 410 is provided with a plate-shaped recess at a position facing a tip of the pin 461 when in the home position, the recess having a cross-section with a curvature greater than that of a spherical head of the tip of the pin and a diameter greater than that of the pin. In a state in which no external force in the horizontal direction is applied, the mandrel 410 and the punch 420 move relative to each other so as to enter a state in which the tip of the pin 416 comes into contact with the deepest portion (central portion) of the recess due to the pressing force of the pressing means 462, and thus the centers of the mandrel 410 and the punch 420 match. Note that this configuration is merely an example, and other configuration may be applied when appropriate.

Next, the drive mechanism 470 for driving the punch 420 will be described. The drive mechanism 470 is included in order to move the punch 420 in the horizontal direction relative to the fixed die 310 and the mandrel 410. More specifically, the drive mechanism 470 reciprocally moves multiple members in an integrated manner, the multiple members being surrounded by a thick dotted line U in FIG. 3 and including the punch 420, the upper platform 430, and the lower platform 440.

The drive mechanism 470 is a linear motion mechanism using a so-called link mechanism (crank mechanism). The drive mechanism 470 includes a servomotor 471, an eccentric pin (crank shaft) 472 that is fixed to a rotation shaft 471a of the servomotor 471, and a connection member 473 and a link portion 474 that convert an axial rotational motion of the eccentric pin 472 into a linear reciprocal motion of the lower platform 440. The lower platform 440 is allowed to move only in a linear reciprocal direction.

FIG. 4 is a diagram illustrating a mechanism for converting the rotational motion caused by the drive mechanism 470 into the linear reciprocal motion and main constituent members viewed from above. The central axis of the eccentric pin 472 in a portion fixed to the connection member 473 is formed to turn about a central axis of a rotation shaft 471a of the servomotor 471. Thick lines in FIG. 4 illustrate positions of the eccentric pin 472a, the connection member 473a, and the link portion 474a when the central axis of the eccentric pin 472a in the fixed portion described above is located directly upward in the drawing with respect to the central axis of the rotation shaft 471a of the servomotor 471. On the other hand, thin lines illustrate positions of the eccentric pin 472b, the connection member 473b, and the link portion 474b when the central axis of the eccentric pin 472b in the fixed portion described above is located rightmost in the drawing with respect to the central axis of the rotation shaft 471a of the servomotor 471.

The fixed portion in the eccentric pin 472 turns in a direction illustrated by an arrow R in FIG. 4 according to the rotation position of the rotation shaft 471a of the servomotor 471. Thus, the connection member 473 moves, whereby the lower platform 440, which is allowed to move only in the linear reciprocal movement direction, moves reciprocally in a direction illustrated by an arrow L in FIG. 4. The servomotor 471 can be controlled so that the rotation shaft 471a is rotated clockwise or counterclockwise at a desired angle. Accordingly, an amount of the reciprocal movement of the lower platform 440 can be controlled by rotating (swinging) the rotation shaft 471a at a desired angle. This enables a movement amount of the punch 420 to be controlled.

<<Step Formation>>

A method for forming the step 11a in the intermediate molded article 100 using the machining apparatus configured as described above will be described with reference to FIG. 5. FIG. 5A shows a state in which each member is located at the home position by the function of the positioning pin structure 460. At the home position, a minute gap is formed between the outer wall surface 111 of the short-sidewall-forming portion 110 of the intermediate molded product 100 and the die 310.

When the movement of the punch 420 is started by the drive mechanism 470, the punch 420 moves toward the die 310. At this time, the support portion 412 of the mandrel 410 is moved toward the die 310 due to frictional resistance caused by the punch 420. Accordingly, the short-sidewall-forming portion 110 is also pressed by the support portion 412 and moves toward the die 310, and thus the short-sidewall-forming portion 110 enters a state of being sandwiched by the die 310 and the support portion 412 (see FIG. 5B). Thus, the die 310 is provided on a side near the outer wall surface of the short-sidewall-forming portion 110, which is the sidewall on which the step 11a is to be formed, with respect to the intermediate molded article 100. The support portion 412 of the mandrel 410 and the die 310 sandwiches the sidewall (short-sidewall-forming portion 110) therebetween on the bottom 13 side (bottom-forming portion 130 side) relative to the portion where the step 11a is formed in the inner wall surface on which the step 11a is to be formed.

Thereafter, by further moving toward the die 310, the punch 420 presses a portion on a side opposite to the bottom 13 with respect to the portion where the step 11a is formed in the inner wall surface on which the step 11a is to be formed, and thus the sidewall (short-sidewall-forming portion 110) is compressed between the punch 420 and the die 310 (see FIG. 5C).

The step 11a is not formed through one instance of a compressing operation performed by the punch 420. That is, the punch 420 is controlled so as to compress the short-sidewall-forming portion 110 by a predetermined amount, and thereafter return in the direction of moving away from the die 310 (see FIG. 5D). At this time, the punch 420 may be moved to such a degree that the state in which the support portion 412 of the mandrel 410 sandwiches the short-sidewall-forming portion 110 between the support portion 412 and the die 310 be maintained.

Thereafter, once again, the punch 420 is controlled to move toward the die 310, and the short-sidewall-forming portion 110 is further compressed by the punch 420 and the die 310. In this manner, the compression amount of the short-sidewall-forming portion 110 is increased little by little due to multiple instances of the repeatedly performed pressing operation by the punch 420. As shown in FIG. 5, the portion of the inclined surface 114 in the short-sidewall-forming portion 110 is compressed in the step-forming step.

FIG. 5E shows a state in which a final pressing operation has been performed by the punch 420, and FIG. 5F shows a state in which the final pressing operation by the punch 420 has ended and the step 11a has been formed on the short-sidewall-forming portion 110. Note that the step surface 11b of the step 11a is level with the step surfaces 115 that have already been formed at the four corners of the rectangular tube of the intermediate molded article 100. As described above, after the step 11a is formed, the intermediate molded article 100 is removed from the machining apparatus, and in the trimming step, the portion 150 to be removed is removed and the final product is obtained.

Here, several examples of methods for controlling the movement amount of the punch 420 in the pressing operation performed by the punch 420 will be described with reference to FIGS. 6 to 8. Note that as described above, the movement amount of the punch 420 can be controlled by controlling the rotational angle of the rotation shaft 471a of the servomotor 471.

Example 1

The movement amount by which the punch 420 is moved toward the die 310 may be controlled by being increased each instance of the repeatedly performed pressing operations. FIG. 6 shows, using a graph, a relationship between an elapsed time and the movement amount of the punch 420 according to the example 1 of the control. By this control, the compression amount of the short sidewall formation portion 110 gradually increases due to the movement amount of the punch 420 being gradually increased each instance of the pressing operation. This makes it possible to form a step 11a having a desired shape without difficulty.

Example 2

The movement amount by which the punch 420 is moved toward the die 310 may be controlled by being increased in stages as a number of instances of the repeatedly performed pressing operations increases. FIG. 7 shows, using a graph, a relationship between an elapsed time and the movement amount of the punch 420 according to the example 2 of the control. The movement amount of the punch 420 is gradually increased every three instances of the pressing operation. By this control as well, the compression amount of the short-sidewall-forming portion 110 gradually increases. This makes it possible to form a step 11a having a desired shape without difficulty.

Example 3

The movement amount by which the punch 420 is moved toward the die 310 may be controlled such that it is identical for all pressing operations that are performed repeatedly. FIG. 8 shows, using a graph, a relationship between an elapsed time and the movement amount of the punch 420 according to the example 3 of the control. Depending on material, thickness, or the like of the product, it is possible to form a step 11a having a desired shape with this kind of control as well.

<Advantages of Manufacturing Method for Rectangular can According to Present Embodiment>

With the manufacturing method according to the present embodiment, due to the step 11a being formed by multiple instances of a pressing operation performed by the punch 420, it is possible to bring the angle formed by the step surface 11b of the step 11a provided in the rectangular can body and the inner wall surface of the rectangular can body closer to 90 degrees. This makes it possible to increase the sealing performance when the opening is closed by the sealing lid 20.

Since the inclined surface 114 is provided in the intermediate molded article 100 in advance and the portion of the inclined surface 114 is compressed in the step-forming step, it is possible to form the step 11a with even less difficulty compared to a case of forming a step by simply performing multiple instances of a pressing operation performed by the punch 420 on a plate-shaped portion.

(Other)

Figure 9:
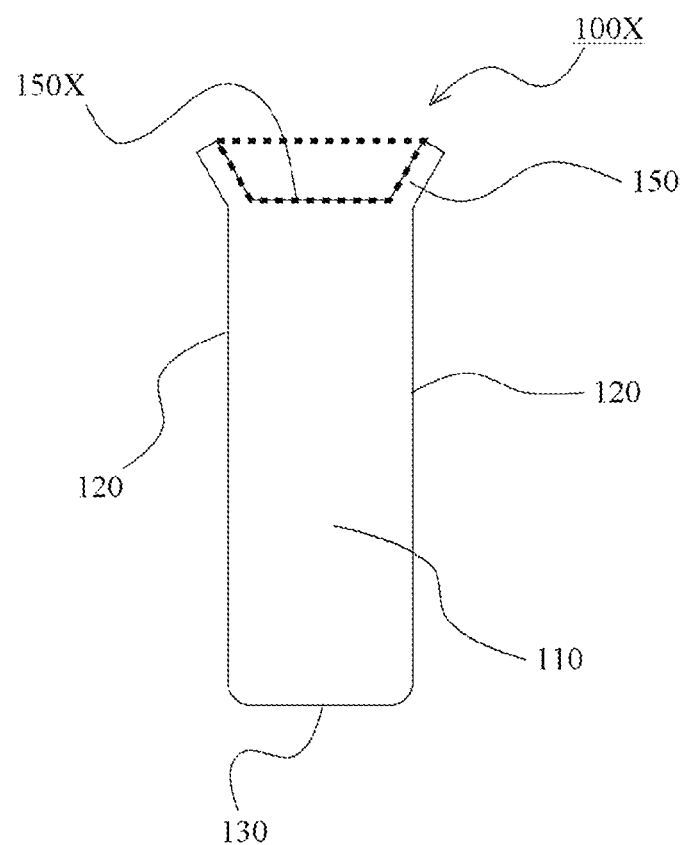
FIG. 9 is an external view of a modified example of the intermediate molded article according to the embodiment of the present disclosure.

Among the portion 150 to be removed in the trimming step, at least a part of the sidewalls (short-sidewall-forming portions 110) on which the steps 11a are to be formed may be removed in advance prior to the step-forming step. This will be described with reference to FIG. 9. FIG. 9 is an external view of an intermediate molded article 100X in the case where a part of the portion 150 to be removed of the intermediate molded article 100 shown in FIG. 2 has been removed in advance. In this intermediate molded article 100X, a part of the portion 150 to be removed, which is surrounded by a thick line 150X in FIG. 9, has been removed in advance. This makes it easier for the material to move out when the short-sidewall-forming portion 110 is compressed by the punch 420 in the step-forming step, and therefore it is possible to form the step 11a with even less difficulty.

Note that the step of removing the part may be performed at any time, as long as it is before the step-forming step. For example, by removing the part in advance when punching is carried out on a metal plate in order to obtain a raw material (blank), the part can be removed without increasing a number of steps.

Although the steps 11a are formed on the pair of short sidewalls 11 in the embodiment described above, steps may also be formed on the pair of long sidewalls 12. The steps may be formed on both the pair of short sidewalls 11 and the pair of long sidewalls 12.

The inclined surface 114 serving as the connection surface provided in the intermediate molded article 100 is constituted by a planar surface in the above-described embodiment. That is, the inclined surface 114 is represented by a straight line when viewed in a cross-sectional view taken along line AA in FIG. 2. However, the connection surface is not limited to this. For example, the connection surface may be constituted by an inclined surface with a curved surface shape. In this case, the inclined surface is indicated by a circular arc or an elliptical arc when viewed in a cross-sectional view taken along line AA in FIG. 2. The connection surface may be constituted by a step-shaped surface.

The inclined surface 114 is provided in advance in the intermediate molded article 100 and the portion of the inclined surface 114 is compressed in the step-forming step in the above-described embodiment. However, the step may be formed through only multiple instances of the pressing operation performed by the punch 420 without providing the inclined surface 114 depending on raw material, thickness, or the like of the product. In this case, as shown in FIG. 9, at least a part of the portion 150 to be removed may be removed in advance.

The step surface 115 that is level with the step surface 11b of the step 11a is formed at the four corners of the rectangular tube through the drawing and ironing step in the step of manufacturing the intermediate molded article in the above-described embodiment. However, the step surfaces provided at the four corners of the rectangular tube may also be formed through the above-described step-forming step. In this case, the inclined surface 114 serving as the connection surface formed in the step of manufacturing the intermediate molded article may be provided up to positions reaching the four corners of the rectangular tube in the intermediate molded article 100. Note that the four corners of the rectangular tube may be constituted by curved surfaces (so-called "R surfaces"). In the step-forming step, the step 11a is formed on not only the short-sidewall-forming portions 110, but also positions reaching the four corners of the rectangular tube.

Furthermore, the machining apparatus of the above-described embodiment used in the step-forming step is merely an example, and another known technique may be employed when appropriate, as long as it is a machining apparatus with which the movement amount of the punch can be controlled. Although the punch 420 operates only through linear reciprocal movement in the above-described machining apparatus, a machining apparatus capable of operating through both linear reciprocal movement and rotational movement may be used. In this case, for example, coining process on the four corners of the rectangular tube may be performed by the machining apparatus. Note that since a known technique may be employed for a mechanism that simultaneously enables both linear reciprocal movement and rotational movement of the punch, such as the mechanism for driving a punch cutter disclosed in Japanese Laid-Open Patent Publication No. 2014-46313, description thereof is omitted.

REFERENCE SIGNS LIST

10 Rectangular can body
11 Short sidewall
11a Step
11b Step surface
12 Long sidewall
20 Sealing lid
100, 100X Intermediate molded article
110 Short-sidewall-forming portion
111 Outer wall surface
112 First parallel surface
113 Second parallel surface
114 Inclined surface
115 Step surface
150 Portion to be removed
310 Die
410 Mandrel
412 Support portion
420 Punch
470 Drive mechanism

The invention claimed is:

1. A method for manufacturing a rectangular can body that has a rectangular tube and a bottom, the method comprising:
a step of forming an intermediate molded article that has the rectangular tube and the bottom, the rectangular tube including a sidewall having an inner wall surface and an outer wall surface; and
a step of forming steps on a pair of facing inner wall surfaces in the rectangular tube, respectively, or forming steps on all of the inner wall surfaces in the rectangular tube,
wherein the step of forming steps comprises
providing a die on an outer wall surface side of the sidewall on which the step is to be formed,
providing a mandrel for sandwiching the sidewall between the mandrel and the die at a portion on a bottom side with respect to a portion where the step is to be formed in the inner wall surface on which the step is to be formed,
providing a punch, and
forming the step by performing a plurality of instances of a pressing operation by with the punch, wherein the pressing operation comprises pressing on a side opposite of the bottom side with respect to the portion where the step is to be formed in the inner wall surface on which the step is to be formed and compressing the sidewall between the punch and the die.

2. The method according to claim 1, wherein:
the outer wall surface of the sidewall formed in the step of forming the intermediate molded article is constituted by a level plane,
the inner wall surface of the sidewall formed in the step of forming the intermediate molded article includes:
a first parallel surface formed at a portion on the bottom side with respect to the portion where the step is to be formed and is parallel to the outer wall surface;
a second parallel surface formed at a portion on the side opposite to the bottom side with respect to the portion where the step is to be formed and is parallel to the outer wall surface, a distance between the second parallel surface and the outer wall surface being shorter than a distance between the first parallel surface and the outer wall surface; and
a connection surface that connects the first parallel surface and the second parallel surface, and
the step of forming steps comprises compressing a portion of the connection surface.

3. The method according to claim 2, wherein the connection surface of the intermediate molded article is provided at positions reaching four corners formed by curved surfaces of the rectangular tube, and the step of forming steps further comprises forming steps at the four corners.

4. The method according to claim 2, wherein in the pressing operation performed by the punch, a movement amount of the punch moving toward the die increases each instance of the pressing operation, which is performed repeatedly.

5. The method according to claim 2, wherein in the pressing operation performed by the punch, a movement amount of the punch moving toward the die increases in stages as the number of instances of the pressing operation, which is performed repeatedly, increases.

6. The method according to claim 2, wherein in the pressing operation performed by the punch, a movement amount of the punch moving toward the die is the same for all pressing operations, which are performed repeatedly.

7. The method according to claim 1, wherein in the pressing operation performed by the punch, a movement amount of the punch moving toward the die increases each instance of the pressing operation, which is performed repeatedly.

8. The method according to claim 1, wherein in the pressing operation performed by the punch, a movement amount of the punch moving toward the die increases in stages as the number of instances of the pressing operation, which is performed repeatedly, increases.

9. The method according to claim 1, wherein in the pressing operation performed by the punch, a movement amount of the punch moving toward the die is the same for all pressing operations, which are performed repeatedly.

10. The method according to claim 1, wherein
the step of forming the intermediate molded article includes a drawing and ironing step of molding the rectangular tube, and
a step surface that is level with the step surface of the step is formed in advance at four corners of the rectangular tube through the drawing and ironing step.

11. The method according to claim 1, further comprising removing a portion on a side opposite to the bottom side of the intermediate molded article after the step of forming steps.

* * * * *

UNITED STATES PATENT AND TRADEMARK OFFICE
CERTIFICATE OF CORRECTION

| | |
|---|---|
| PATENT NO. | : 12,070,788 B2 |
| APPLICATION NO. | : 17/417914 |
| DATED | : August 27, 2024 |
| INVENTOR(S) | : Yousuke Ogawa et al. |

It is certified that error appears in the above-identified patent and that said Letters Patent is hereby corrected as shown below:

In the Claims

Column 11, Line 47, Claim 1, "by with" should be -- with --.

Signed and Sealed this
First Day of April, 2025

Coke Morgan Stewart
*Acting Director of the United States Patent and Trademark Office*